United States Patent Office 2,985,505
Patented May 23, 1961

2,985,505
SALT CONVERSION PROCESS

Harold H. Van Tuyl, Richland, Wash., assignor to the United States of America as represented by the United States Atomic Energy Commission No Drawing. Filed July 21, 1959, Ser. No. 828,671

7 Claims. (Cl. 23—25)

The invention relates to a process for converting complex cyanide salts of cesium into simple salts, more particularly for converting complex cyanide salts of the radioactive isotope of cesium of mass number 137, which have been separated as precipitates from nuclear reactor waste solutions, into cesium chloride.

All nuclear reactors now in operation create significant amounts of the radioactive isotope of cesium referred to as one of the fission products of the actinide fuel, brought about by its neutronic irradiation within the reactor. After fuel "burn-up" has proceeded far enough for the reactor operation to lose efficiency, reactor shut-down takes place and the fuel is "reprocessed" by various methods. Commonest among these are the so-called "wet methods"; in these methods the fuel, along with its protective cladding or "cans," and even structural parts of the reactor core than cannot be easily separated, are dissolved together in some chemical solvent, usually strong nitric acid, and the unspent fuel is removed therefrom by various methods such as organic solvent extraction, selective precipitation, and ion exchange. The resulting solutions after these fuel values have been removed are commonly called "waste solutions," but this is not altogether descriptive since they contain components of definite economic value such as the ions of cesium 137. This isotope with its 37 year half-like is, for all practical purposes a constant, as well as a convenient source of beta and gamma radiations in such applications as leak testing, thickness gauging and the like.

A number of methods are known whereby cesium values may be separated from waste solutions by precipitation and coprecipitation in the form of complex cyanide salts of the Werner type. These salts are not usable for radiation source purposes because the radiations from the cesium 137 decompose the anions into their elements including nitrogen from the cyanide group; since for safety reasons the radioactive materials must be confined in closed containers the accumulation of nitrogen gas builds up dangerous pressures tending to rupture the containers, and therefore the radioactive material must be in some more stable form. Cesium chloride has been found to be the best salt of cesium for these purposes.

As indicated above, however, cesium values must initially be recovered from reactor waste solutions by precipitation of insoluble complex cyanides. Under some circumstances all the cations in the precipitate are cesium, but more commonly, particularly in coprecipitation processes where the cesium is present in relatively small amounts, the salts are of double, triple or other multiple type, with cesium sharing the cationic function with other metals. Likewise, the salts may be multiple with respect to the anions; quite a number of both cations and anions may become associated together to form a large molecule, the proportions of which vary so that it has become the practice to write the chemical formulas somewhat empirically, writing down the formulas of two or more discreet salts with a dot between although the actual structure is believed to be spatially oriented in quite a different way. The variability of proportions referred to is indicated by a "x" coefficient of one of the salts. In any event these theoretical considerations are not material to the practice of the present invention, which may be carried out regardless of how complicated the precipitates may be, or even if their exact constituents are unknown. Likewise, the water of hydration, which is practically always present in Werner compounds to some extent, is another immaterial matter so far as the present invention is concerned and will not be indicated in any of the chemical equations appearing later herein.

For practical purposes, when a waste solution is treated, for example, with zinc and ferrocyanide ions under proper conditions a precipitate or coprecipitate will come down including the group consisting of these chemical individuals:

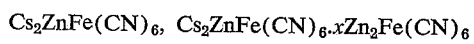

and

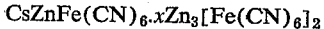

The exact conditions by which this precipitation or coprecipitation is brought about is not a part of this invention, but may be found by reference to U.S. Patent No. 2,769,780, to Warren E. Clifford and Raymond E. Burns, to their patent application Serial No. 477,144, filed December 22, 1954, to the patent application of Charles A. Goodall, Serial No. 696,580, filed November 14, 1957, now U.S. Patent No. 2,952,640, to applicant's application Serial No. 646,181, filed March 14, 1957, now abandoned, and elsewhere; my invention is addressed to the further treatment of the precipitate after it has been made. The precipitate will vary in exact composition due to the variability of the waste solutions from different reactors, from different runs of same reactor, and from the tendency of Werner compounds to form in a number of alternate ways that cannot be distinguished except by the most painstaking analytical methods which are not necessary to be carried out for purpose of this invention. My invention works on an extremely wide variety of materials, so long as they are complex cyanide precipitates of the general type indicated. Not only may the anions be ferrocyanides and ferricyanides, but also complex cyanides where the metal within the anion is cobalt, nickel or copper. However, my preferred starting material is a precipitate brought about by introducing zinc ions and ferrocyanide ions into the waste solution and which, regardless of the particular reactor waste solution under treatment, will consist quite largely of the group of chemical individuals set forth above.

Prior to my invention the known methods for converting the cesium complex cyanide precipitates into more stable compounds were lacking in some way; pyrochemical methods, by which the precipitates are decomposed by direct application of heat, create dangerous fumes which are difficult to control within the closed systems of remote mechanical or "glove-box" manipulation. The most commonly used "wet chemical" method has been to dissolve the precipitates in strong mineral acids and then to add a soluble salt such as silver nitrate to act as a metathetical agent and form an insoluble precipitate with the complex cyanide anion. An example of such a metathetical reaction is the following:

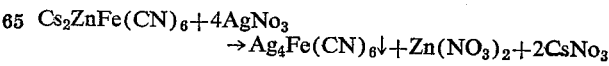

While the above reaction was successful to the extent of removing the ferrocyanide it still left the zinc in solution with the cesium. While an additional precipitation reaction to remove the zinc is theoretically possible, it has been found that such reactions tend to contaminate the cesium and removal of excess reagents is quite difficult.

It is, accordingly, the object of the present invention to devise a method whereby cesium may be removed from a complex cyanide precipitate and isolated in the form of a simple salt in a single step without the need for a second precipitation.

It is a further object to devise a method of isolating cesium chloride from complex cyanides without contamination and dilution by excess reagents.

I have found that instead of using the conventional soluble metathetical agent in a two-step process, cesium may be converted to a simple salt from complex cyanides in a single step by means of a comparatively insoluble metathetical agent in an aqueous suspension at neutrality or slightly above or below it, preferably within the pH range of about 4 to 9. The insoluble metathetical agent should be one that forms an insoluble precipitate not only with such anions as ferrocyanide, ferricyanide, cobalticyanide, and the like, but also with the multi-valent metals such as zinc which have a cationic function, while leaving the cesium in solution so that it may then be separated by filtration, or decantation, or centrifugation from the precipitate, followed by removal of the water, as by heating or evaporation. My preferred solid metathetical agent is silver carbonate; its suspension reacts with cesium complex cyanide precipitates to form insoluble carbonates with all cationic metals except alkali metals in a single stage, leaving cesium in solution as the soluble carbonate and without any danger of any unreacted reagent being left over since it is a solid and only goes into solution to the extent required. Alkali metals other than cesium are not present in the starting precipitates, and therefore, need not be considered. The following are representative equations exemplifying the opertion of my process:

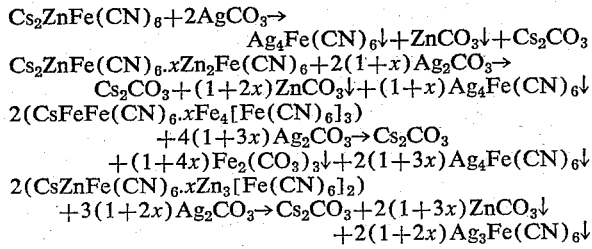

Repeated trials of my process indicate that it follows these theoretical equations quite faithfully, giving recoveries of cesium of 99.9% of the theoretical when the initial pH was 1, to 70% when the initial pH was 13, with recoveries intermediate to these following about linearly with variations in pH. My preference, above mentioned, of the pH range of 4 to 9 is due to the fact that within it there is no danger of decomposing the carbonate or complex cyanide radicals, and that side reactions due to the presence of unusual constituents in the precipitate are less likely to occur. Furthermore, no steps are normally, if ever, necessary to bring the reaction mixture within this range since aqueous slurries of the solids in question will be within it naturally. While the particle size of the reactants of my process is not, strictly speaking, a critical matter, still, as is true of all reactions between solids, the speed of this reaction is dependent on the surface area and the particle size should be small enough to enable the reaction to proceed at a reasonable pace. I have found that silver carbonate of 100 to 200 mesh to be the optimum size and prefer to add it in a suspension of about one gram to 20 milliliters of water. Mild agitation of the reaction mixture should be supplied, as for example, by a whip stirrer. The reaction will proceed in the absence of heat, but, of course, its rate will increase if heat is employed and I prefer to heat the reaction mixture to about 90° C., which enables the reaction to be carried with the agitation and other conditions mentioned in about one hour.

An additional advantage of my method is that in case there should be any unreacted complex cyanide salts left in solution from previous steps in the separation process, my solid metathetical agent will remove them by a precipitation reaction of which this is representative:

$$Zn_2Fe(CN)_6 + 2Ag_2CO_3 \rightarrow Ag_4Fe(CN)_6\downarrow + 2ZnCO_3\downarrow$$

Thus all unreacted reagents will be precipitated out of the solution along with the main reaction, whereas the method of the prior art will not accomplish this result, as can be seen from this representative equation:

$$Zn_2Fe(CN)_6 + 4AgNO_3 \rightarrow Ag_4Fe(CN)_6\downarrow + 2Zn(NO_3)_2$$

While the above reaction succeeds in removing the anions of the unreacted reagents, it fails to do so for the cations such as zinc which remain in solution and have to be removed with the attendant danger of contamination and difficulty of removal of excess reagents above referred to.

It will be seen, therefore, that my invention enables cesium to be removed from a complex cyanide salt and isolated as a simple salt, cesium carbonate, in one stage. This salt may be recovered in a dry state simply by filtration or decantation followed by evaporating the water. However, for the safety reasons above mentioned, it is preferable to convert the simple carbonate salt to another simple salt such as the chloride, by a metathetical or double decomposition reaction which goes to completion due to the formation of carbon dioxide when the carbonate is acidified, according to the following equation:

$$Cs_2CO_3 + 2HCl \rightarrow 2CsCl + H_2O + CO_2\uparrow$$

The above reaction is an easy one to handle since the hydrochloric acid may be added until all evolution to carbon dioxide ceases, and in case an excess of acid has been added it may be simply removed by evaporation along with the water to give the dry cesium chloride.

*Example*

1000 ml. of a simulated waste solution was made up having a pH of 4 and containing 6 M sodium nitrate, 0.04 M sodium sulphate, and 0.0004 M cesium nitrate which was nearly all cesium 133 but contained a trace of cesium 134 for analytical purposes. A precipitate of cesium zinc ferrocyanide was made from this solution according to the method set forth in my said abandoned application Serial No. 646,181, by adding at room temperature, 0.13 g. of potassium ferrocyanide and thereafter 0.12 g. of zinc nitrate and the resulting precipitate was filtered and found to have a volume of about 1 ml. A suspension of silver carbonate of 100 to 200 mesh particle size was made up in the proportions of 1 g. of solids to 20 ml. of water and 7 ml. of the suspension were slurried together with the precipitate by means of a whip stirrer at about 90° C. for about one hour. At the end of this time the slurry was filtered, washed with 10 ml. of water, and to the filtrate plus wash, hydrochloric acid was added until the evolution of gas ceased. The filtrate was then evaporated to dryness and the solid cesium chloride collected, which was found to weigh 0.0815 g. Analysis with a beta counter showed a cesium recovery of 95% of the theoretical.

It will be understood that this invention is not to be limited to the details given herein, but that it may be modified within the scope of the appended claims.

What is claimed is:

1. A method of removing the cesium cations of a precipitate of insoluble complex cyanide salts having cesium cations and other cations and isolating the cesium cations as cations of a simple salt, comprising bringing the insoluble complex cyanide salt into contact with an aqueous suspension of silver carbonate so as to form, by a metathetical reaction, a second precipitate containing said other cations and the anions of the complex cyanide salt while leaving the cesium cations and an equivalent number of carbonate anions in solution, and then separating the supernatant liquor of said solution from the second precipitate.

2. The method of claim 1 where the pH of the aqueous suspension is within the range of 4 to 9.

3. The method of claim 2 where the particle size of the silver carbonate is 100 to 200 mesh and the proportions of the suspension are 20 ml. of water to 1 g. of silver carbonate.

4. The method of claim 3 where the complex cyanide salt is cesium zinc ferrocyanide.

5. The method of claim 4 where the second precipitate is separated from the supernatant liquor containing cesium carbonate by filtration and the filtrate is evaporated to dryness to recover cesium carbonate in the dry state.

6. The method of claim 1 where the supernatant liquor is acidified by hydrochloric acid until evolution of carbon dioxide is complete, and the resulting solution is evaporated to dryness to recover cesium chloride in the dry state.

7. The method of claim 1 where the insoluble complex cyanide salt precipitate consists essentially of a mixture of $$Cs_2ZnFe(CN)_6, \quad Cs_2ZnFe(CN)_6 \cdot xZn_2Fe(CN)_6,$$
$$CsFeFe(CN)_6 \cdot xFe_4[Fe(CN)_6]_3$$

and $CsZnFe(CN)_6 \cdot xZn_3[Fe(CN)_6]_2$, where "$x$" denotes a variable proportional coefficient.

References Cited in the file of this patent

UNITED STATES PATENTS 2,892,680     Burgus _____ June 30, 1959

OTHER REFERENCES

Moore et al.: "United Nations International Conference on the Peaceful Uses of Atomic Energy," vol. 18, 1958, pages 231–236, United Nations Publications.